(12) United States Patent
Shigeeda

(10) Patent No.: US 9,391,950 B2
(45) Date of Patent: Jul. 12, 2016

(54) IP ADDRESS DISTRIBUTION SYSTEM AND IP ADDRESS DISTRIBUTION METHOD

(75) Inventor: Tetsuya Shigeeda, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 146 days.

(21) Appl. No.: 14/364,496

(22) PCT Filed: Jan. 10, 2012

(86) PCT No.: PCT/JP2012/050285
§ 371 (c)(1),
(2), (4) Date: Jun. 11, 2014

(87) PCT Pub. No.: WO2013/105219
PCT Pub. Date: Jul. 18, 2013

(65) Prior Publication Data
US 2014/0344477 A1 Nov. 20, 2014

(51) Int. Cl.
*G06F 15/16* (2006.01)
*H04L 29/12* (2006.01)

(52) U.S. Cl.
CPC ........ *H04L 61/2007* (2013.01); *H04L 61/2038* (2013.01); *H04L 61/103* (2013.01); *H04L 61/2015* (2013.01)

(58) Field of Classification Search
USPC .................................. 709/222, 203, 226, 245
See application file for complete search history.

(56) References Cited

U.S. PATENT DOCUMENTS

2009/0245132 A1* 10/2009 Beser .................. H04L 12/4645
370/254
2011/0280158 A1 11/2011 Shigeeda
(Continued)

FOREIGN PATENT DOCUMENTS

JP  4744645 B2  8/2011
JP  4790088 B1  10/2011

OTHER PUBLICATIONS

International Search Report (PCT/ISA/210) mailed on Feb. 7, 2012, by the Japanese Patent Office as the International Searching Authority for International Application No. PCT/JP2012/050285.
(Continued)

*Primary Examiner* — El Hadji Sall
(74) *Attorney, Agent, or Firm* — Buchanan Ingersoll & Rooney PC

(57) ABSTRACT

An IP address distribution system includes a network containing a plurality of switch apparatuses, IP address distribution apparatuses that assign an IP address according to a request from each of devices connected to the switch apparatuses, and a plurality of position information distribution apparatuses that broadcast a position information packet containing position information into the network, wherein a specific physical port of at least one switch apparatus blocks the position information packet to cause only a single position information packet to be delivered to the devices, the devices transmit an IP-address request signal containing the position information and device-specific information, when requesting assignment of an IP address, and the IP address distribution apparatuses select an IP address from a range corresponding to the position information and the device-specific information and distribute the IP address to a request source device, when receiving the IP-address request signal.

8 Claims, 7 Drawing Sheets

(56) References Cited

U.S. PATENT DOCUMENTS

2011/0286464 A1 11/2011 Shigeeda et al.
2012/0166601 A1* 6/2012 Wittenschlaeger ..... H04L 12/66
709/221

OTHER PUBLICATIONS

Written Opinion (PCT/ISA/237) mailed on Feb. 7, 2012, by the Japanese Patent Office as the International Searching Authority for International Application No. PCT/JP2012/050285.

Masuda et al., "Implementation of a port-aware DHCP server using FDB in the Switching HUB", IPSJ STG Technical Reports, May 2005, pp. 41-46, vol. 2005, No. 39 (with English abstract).

Comer, Internetworking with TCP/IP, "Bootstrap and Autoconfiguration (DHCP)", pp. 403-416, vol. 1, $4^{th}$ edition.

Office Action (Notice of Rejection) issued on Jun. 4, 2012, by the Japan Patent Office in corresponding Japanese Patent Application No. 2012-519647, and an English Translation of the Office Action. (5 pages).

* cited by examiner

FIG.3

| TRANSMISSION DESTINATION ADDRESS |
|---|
| TRANSMISSION SOURCE ADDRESS |
| POSITION INFORMATION VALUE |
| DEVICE-SPECIFIC INFORMATION |

FIG.4

| POSITION INFORMATION | DEVICE TYPE | IP ADDRESS |
|---|---|---|
| 1 | DEVICE A | 192.168.1.1 |
| | DEVICE B | 192.168.1.2 |
| | OTHER | 192.168.1.3 TO 192.168.1.254 |
| 2 | DEVICE A | 192.168.2.1 |
| | DEVICE B | 192.168.2.2 |
| | OTHER | 192.168.2.3 TO 192.168.2.254 |

FIG.8

| TRANSMISSION DESTINATION ADDRESS |
| TRANSMISSION SOURCE ADDRESS |
| POSITION INFORMATION VALUE |
| PHYSICAL PORT NUMBER |

FIG.9

| TRANSMISSION DESTINATION ADDRESS |
| TRANSMISSION SOURCE ADDRESS |
| POSITION INFORMATION VALUE |
| DEVICE-SPECIFIC INFORMATION |

IP ADDRESS DISTRIBUTION SYSTEM AND IP ADDRESS DISTRIBUTION METHOD

FIELD

The present invention relates to an IP address distribution system and an IP address distribution method.

BACKGROUND

TCP/IP often used as a communication protocol between apparatuses uses IP addresses as information for identifying the apparatuses. When TCP/IP is used, IP addresses uniquely defined need to be allocated to apparatuses on a network, respectively.

As a method of determining an IP address for each of apparatuses on a network, a method in which an IP address is provided to each of the apparatuses without any overlap, the IP address is recorded in a recording device included in each of the apparatuses, and each of the apparatuses uses the recorded IP address at the time of startup is employed.

As another method of determining an IP address for each of apparatuses on a network, a RARP (Reverse Address Resolution Protocol) is used. When the RARP is applied, each of the apparatuses performs broadcast transmission of an RARP message to the network at the time of startup. In response to the RARP message, an RARP server on the network distributes an IP address to the transmission source apparatus via the network.

There are also a BOOTP (Boots Trap Protocol) and a DHCP (Dynamic Host Configuration Protocol) as IP address distribution methods alternative to the RARP. In either scheme, a server that manages IP addresses distributes an IP address in response to a request from an apparatus, thereby determining the IP address (see, for example, Non Patent Literature 1).

CITATION LIST

Non Patent Literature

Non Patent Literature 1: Internetworking with TCP/IP Vol. 1, 4th edition, by Douglas E. Comer (Kyoritsu Shuppan)

SUMMARY

Technical Problem

In the IP address distribution methods mentioned above, a server that has received an IP-address distribution request assigns an IP address to a request source device. However, because IP address assignment is not performed considering a physical configuration of the network, the following problems occur.

For example, a case where TCP/IP is used in a network having a device configuration previously designed is considered. In this network, arrangement of network devices is already defined and thus, when apparatus replacement is required due to a malfunction of an apparatus, it is preferable for the network operation that the same (or a relevant) IP address as that having been provided to the malfunctioning apparatus is provided to the corresponding apparatus after the replacement according to device arrangement. When an IP address is provided according to the device arrangement, convenience is improved in management of the devices. For example, when a communication failure occurs, involved devices can be easily specified. To provide the same or relevant IP address as that having been provided to an apparatus before replacement to an apparatus after the replacement, an operator writes a desired IP address during apparatus installation. However, if an IP address corresponding to an installation position can be provided automatically after apparatus replacement, ease of the operation is improved. When setting is manually performed by a person, though an operation error may occur, the operation error can be prevented by automation. Therefore, it is desirable that, when an apparatus is installed, an IP address corresponding to the device arrangement is distributed automatically.

The present invention has been achieved in view of the problems mentioned above, and an object of the present invention is to provide an IP address distribution system and an IP address distribution method that, when an apparatus to which an IP address is not provided is newly installed due to apparatus replacement or the like, can provide an IP address corresponding to an installation position to the newly-installed apparatus.

Solution to Problem

The present invention is directed to an IP address distribution system that achieves the object. The IP address distribution system includes a network including a plurality of switch apparatuses; an IP address distribution apparatus that assigns an IP address according to a request from each of devices connected to the switch apparatuses; and a plurality of position information distribution apparatuses that broadcast a position information packet including position information into the network. A specific physical port of at least one switch apparatus blocks the position information packet to cause only a single position information packet to be delivered to each of the devices. When requesting assignment of an IP address, the devices transmit an IP-address request signal including the position information and device-specific information. When receiving the IP-address request signal, the IP address distribution apparatus selects an IP address from a range corresponding to the position information and the device-specific information included in the IP-address request signal, and distributes the selected IP address to a request source device.

Advantageous Effects of Invention

According to the present invention, each of the position information distribution apparatuses delivers position information to terminals that receive assignment of an IP address, each of the terminals transmits an IP-address request signal including the position information and device type information thereof when requesting distribution of an IP address, and the IP address distribution apparatus assigns an IP address corresponding to the type and the position information of a request source terminal. Therefore, an IP address can be distributed to correspond to the position of each device on a physical wire in a network.

BRIEF DESCRIPTION OF DRAWINGS

FIG. 3 is a configuration example of an IP-address request signal.

FIG. 4 is a configuration example of an IP-address distribution table.

FIG. 8 is a configuration example of a position information packet in the third embodiment.

FIG. 9 is a configuration example of an IP-address request signal transmitted by the terminals in the third embodiment.

DESCRIPTION OF EMBODIMENTS

Exemplary embodiments of an IP address distribution system and an IP address distribution method according to the present invention will be explained below in detail with reference to the accompanying drawings. The present invention is not limited to the embodiments.

First embodiment

Figure 1:
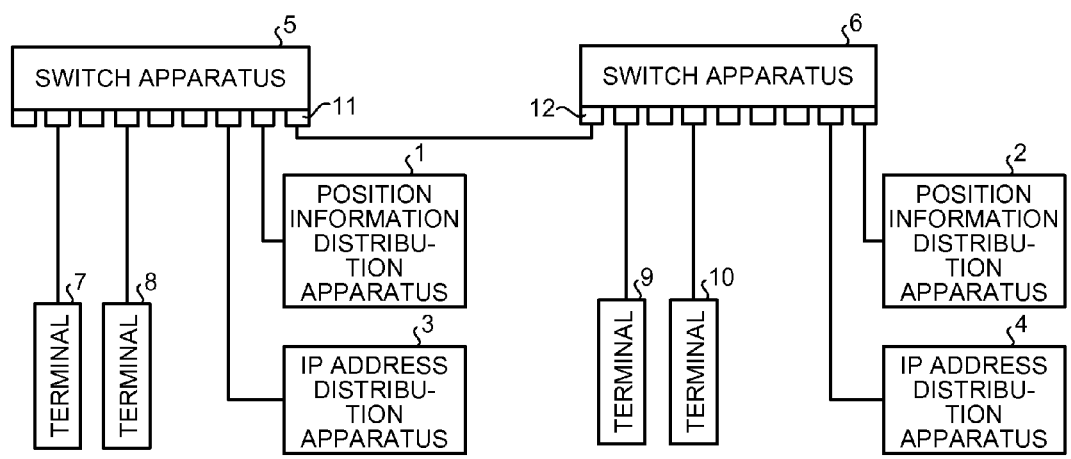
FIG. 1 is a configuration example of an IP address distribution system according to a first embodiment.

FIG. 1 is a configuration example of an IP address distribution system according to a first embodiment. The IP address distribution system according to the present embodiment is configured to include position information distribution apparatuses 1 and 2, IP address distribution apparatuses 3 and 4, and switch apparatuses 5 and 6 serving as Ethernet® switches, respectively. The position information distribution apparatus 1 and the IP address distribution apparatus 3 are connected to the switch apparatus 5, and the position information distribution apparatus 2 and the IP address distribution apparatus 4 are connected to the switch apparatus 6. The switch apparatuses 5 and 6 are connected to each other via a physical port 11 of the switch apparatus 5 and a physical port 12 of the switch apparatus 6.

Terminals 7 and 8 are connected to physical ports of the switch apparatus 5, respectively, and terminals 9 and 10 are connected to physical ports of the switch apparatus 6, respectively. The terminals 7 to 10 are network devices that request the IP address distribution apparatus 3 or 4 to assign an IP address and that receive assignment of an IP address. The position information distribution apparatuses 1 and 2 each distribute to the terminals connected to the involved switch apparatus 5 or 6, position information that indicates where the terminals are located (physical installation positions) in a network. Each of the IP address distribution apparatuses 3 and 4 holds therein an IP-address distribution table (details thereof are explained later) and assigns an IP address according to the IP-address distribution table when receiving a request for distribution of an IP address from one of the terminals.

Figure 2:
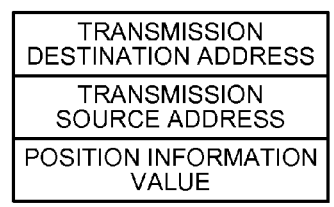
FIG. 2 is a configuration example of a position information packet.

FIG. 2 is a configuration example of a position information packet that is transmitted by the position information distribution apparatus 1 or 2 to the terminals to notify the terminals of position information in the IP address distribution system according to the first embodiment. As shown in FIG. 2, the position information packet has areas for storing therein a transmission destination address, a transmission source address, and a position information value, respectively.

The position information distribution apparatuses 1 and 2 each transmit the position information packet shown in FIG. 2 at a predetermined timing (transmit cyclically, for example). At that time, the position information distribution apparatuses 1 and 2 each set a multicast address for position information distribution as the transmission destination address, the IP address of the own apparatus as the transmission source address, and a value indicating the position in the network of terminals that receive the position information packet as the position information value. The position information distribution apparatuses 1 and 2 set values unique to the position information distribution apparatuses, respectively, as the position information value in such a manner that the set values do not overlap with values set by other position information distribution apparatuses in the position information packet.

An operation (physical port setting) of the switch apparatuses 5 and 6 is explained. The physical port 11 of the switch apparatus 5 blocks packets in which the multicast address for position information distribution is set as the transmission destination address. Other physical ports do not block packets in which the transmission destination address is the multicast address for position information distribution. The physical port 12 of the switch apparatus 6 blocks packets in which the multicast address for position information distribution is set as the transmission destination address. Other physical ports do not block packets in which the transmission destination address is the multicast address for position information distribution. That is, in the switch apparatuses 5 and 6, the physical ports connected to the other switch apparatus block packets in which the multicast address for position information distribution is set as the transmission destination address.

Accordingly, the position information packet transmitted from the position information distribution apparatus 1 reaches only the terminals 7 and 8 and the position information packet transmitted from the position information distribution apparatus 2 reaches only the terminals 9 and 10.

FIG. 3 is a configuration example of an IP-address request signal that is transmitted to the IP address distribution apparatus 3 or 4 when the terminals 7 to 10 request IP address distribution in the IP address distribution system according to the first embodiment. As shown in FIG. 3, the IP-address request signal has areas for storing therein a transmission destination address, a transmission source address, a position information value, and device-specific information, respectively. A broadcast address and a temporary IP address are set as the transmission destination address and the transmission source address, respectively. The position information value (see FIG. 2) included in the position information packet that has been received by a transmission source device from the involved position information distribution apparatus is set as the position information value. Information indicating the type of the transmission source device (device type information) is set as the device-specific information. For example, when the terminals 7 to 10 are devices installed on train cars, device type information indicating a guide display, an air conditioner, a braking device, or the like is set as the device-specific information. It is assumed that each of the terminals previously holds therein the device type information.

The IP-address distribution table held in each of the IP address distribution apparatuses is explained below. The IP-address distribution table is information indicating an IP address or a range of IP addresses to be distributed to a combination of the position information value and the device-specific information (the device type information in the present embodiment) and is information with a configuration shown in FIG. 4, for example. Upon reception of an IP-address request signal, each of the IP address distribution apparatuses checks the position information value and the device-specific information (the device type information) set in the received request signal and assigns an IP address corresponding to these two pieces of information to a terminal as the request source. For example, when receiving an IP-address request signal in which "1" is set as the position information value and "device A" is set as the device-specific information, the IP address distribution apparatus that holds therein the IP-address distribution table shown in FIG. 4 assigns "192.168.1.1" as the IP address. When receiving an IP-address request signal in which "2" is set as the position information value and "other" is set as the device-specific information, the IP address distribution apparatus selects one of IP addresses included in a range of "192.168.2.3 to 192.168.2.254" and unassigned to any terminals and assigns the selected IP address as the IP address.

Figure 5:
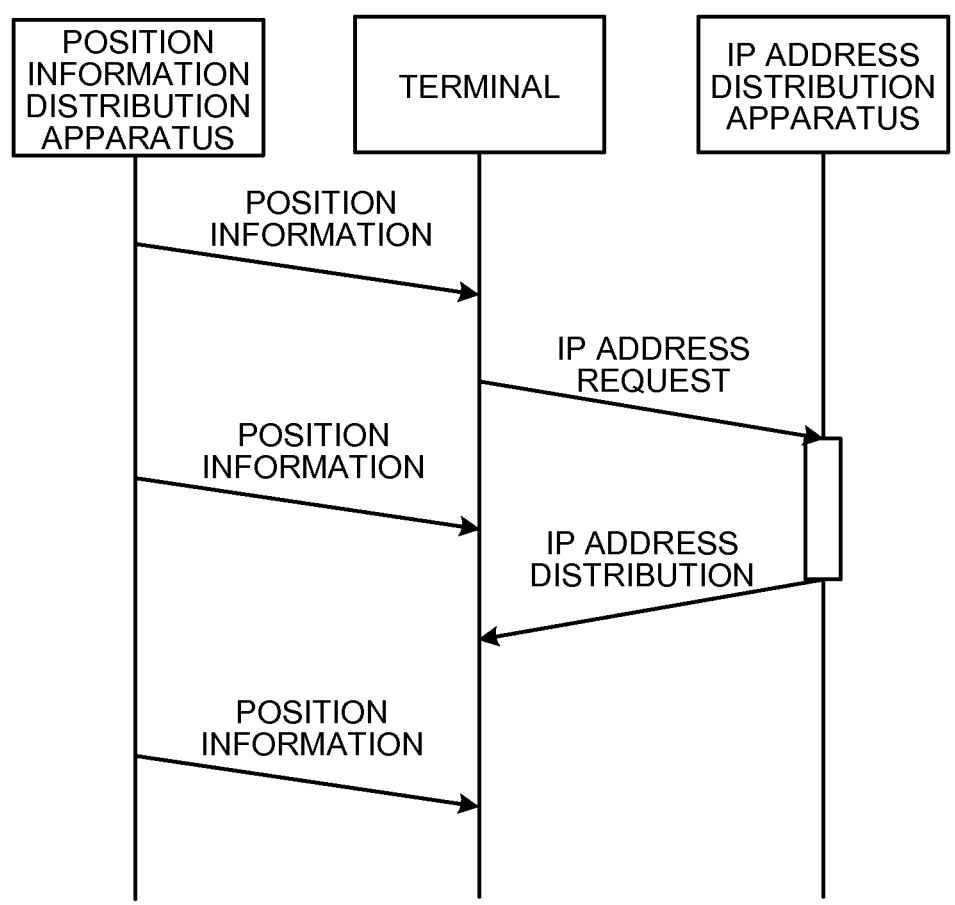
FIG. 5 is a sequence diagram of an example of a procedure of determining an IP address of a terminal in the IP address distribution system according to the first embodiment.

A procedure of determining an IP address of a terminal in the IP address distribution system according to the present embodiment is explained next with reference to a sequence diagram of FIG. 5. As shown in FIG. 5, each of the position information distribution apparatuses 1 and 2 multicast-transmits the position information packet periodically. At that time, because the position information packets are blocked by specific physical ports of the switch apparatuses (physical ports to which the other switch apparatus is connected), the terminals 7 to 10 do not receive the position information packets from a plurality of the position information distribution apparatuses. Upon reception of the position information packet, each of the terminals 7 to 10 extracts the position information value from the position information packet. Then, when requesting assignment of an IP address (when not being assigned with an IP address), each of the terminals 7 to 10 sets the position information value obtained from the position information distribution apparatus 1 or 2 and the device type information previously held in an IP-address request signal and transmits the IP-address request signal. Upon reception of the IP-address request signal, each of the IP address distribution apparatuses 3 and 4 determines an IP address to be assigned to the request source terminal by using the IP-address distribution table (see FIG. 4) held therein and transmits an IP-address distribution signal including information of the determined IP address to the request source terminal.

The IP address distribution apparatuses 3 and 4 hold therein the same IP-address distribution table and assign an IP address in the same procedure when receiving an IP-address request signal. That is, when receiving an IP-address request signal having the same position information value and the same device type information, the IP address distribution apparatuses 3 and 4 assign the same IP address. The terminals 7 to 10 will receive an IP-address distribution signal including the same contents plural times from different IP address distribution apparatuses. Accordingly, when a signal having reached earlier has been received normally, the terminals 7 to 10 can ignore signals reaching later. When IP-address distribution signals having been received plural times contain the same IP address information, the terminals 7 to 10 can determine that IP address assignment has been performed correctly and start using the assigned IP address.

As a mechanism of IP address distribution performed between the IP address distribution apparatuses and the terminals in the IP address distribution system according to the present embodiment, each of the IP address distribution apparatuses can perform an operation of a DHCP server and each of the terminals can perform an operation of a DHCP client.

As described above, the IP address distribution system according to the present embodiment is configured to include the position information distribution apparatuses, the IP address distribution apparatuses, and the switch apparatuses. Each of the position information distribution apparatuses delivers position information indicating the physical installation position to terminals that receive assignment of an IP address, each of the terminals transmits an IP-address request signal including the position information obtained from the involved position information distribution apparatus and the apparatus type information of the terminal when requesting distribution of an IP address, and each of the IP address distribution apparatuses assigns an IP address according to the type and the installation position of the request source terminal. Therefore, an IP address can be assigned to correspond to the position (the installation position) of a device on a physical wire in a network. For example, even in a case where a device that receives distribution of an IP address is replaced due to a malfunction or the like, the same IP address as that of the device before replacement can be provided to a device after replacement if the IP address having been provided to the malfunctioning device is released at the time of replacement or before replacement. Even if the IP address having been provided to the malfunctioning device is not released, an IP address with a value close to that having been provided to the device before replacement can be provided to the device after replacement.

As a process of releasing the IP address having been provided to a malfunctioning device, the IP address distribution apparatuses can transmit a signal to each of devices to which an IP address has been already provided, at a predetermined period to perform an inquiry, and, if there is a device not responding thereto, release the IP address having been provided to the non-responding device, for example.

It is alternatively possible that, upon reception of an IP-address request signal, each of the IP address distribution apparatuses transmits signals having distributed IP addresses in a range corresponding to the position information added to the signals as the destinations, respectively, to inquire presence of devices (devices to which an IP address has been already provided) and, when there is a device not responding thereto, redistributes the IP address having been provided to the non-responding device to a device as the transmission source of the IP-address request signal. In this case, when a device is replaced, the IP address having been provided to the device before replacement can be reliably provided to a device after replacement.

Furthermore, the switch apparatuses block the position information packets at predetermined physical ports so that only the position information packet transmitted from one of the position information distribution apparatuses reaches each of the terminals. Therefore, an IP address corresponding to a practical installation position of each of the terminals can be reliably assigned.

While the IP address distribution system including two IP address distribution apparatuses has been explained in the present embodiment, one IP address distribution apparatus suffices in the system.

While explanations have been made assuming that the position information distribution apparatuses are different from the IP address distribution apparatuses, the present embodiment can be achieved by incorporating a position information distribution function and an IP address distribution function in one apparatus.

Second Embodiment

Figure 6:
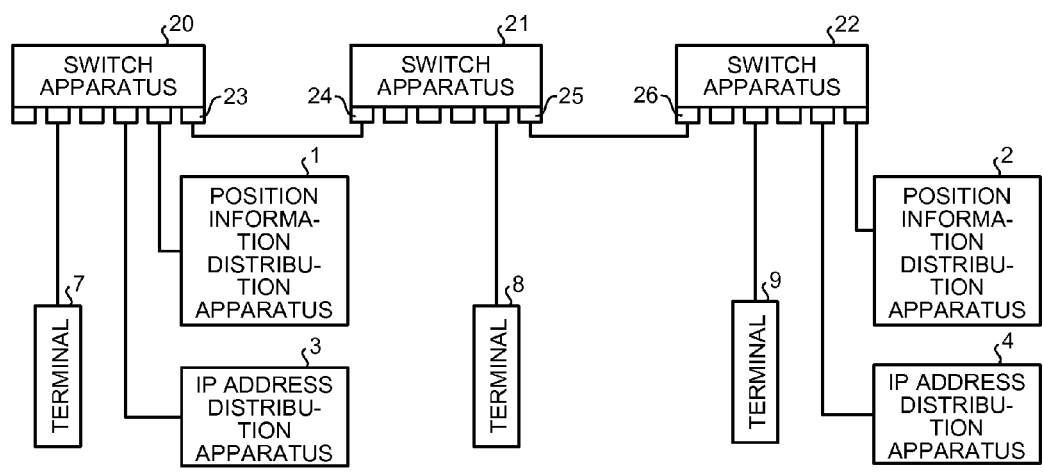
FIG. 6 is a configuration example of an IP address distribution system according to a second embodiment.

FIG. 6 is a configuration example of an IP address distribution system according to a second embodiment. The IP address distribution system according to the present embodiment is configured to include the position information distribution apparatuses 1 and 2, the IP address distribution apparatuses 3 and 4, and switch apparatuses 20 to 22 serving as Ethernet® switches, respectively. The position information distribution apparatus 1 and the IP address distribution apparatus 3 are connected to the switch apparatus 20, and the position information distribution apparatus 2 and the IP address distribution apparatus 4 are connected to the switch apparatus 22. The switch apparatuses 20 and 21 are connected to each other via a physical port 23 of the switch apparatus 20 and a physical port 24 of the switch apparatus 21. The switch apparatuses 21 and 22 are connected to each other via a physical port 25 of the switch apparatus 21 and a physical port 26 of the switch apparatus 22.

The terminal 7 is connected to a physical port of the switch apparatus 20, the terminal 8 is connected to a physical port of the switch apparatus 21, and the terminal 9 is connected to a physical port of the switch apparatus 22.

A difference between the IP address distribution system according to the present embodiment and the IP address distribution system according to the first embodiment is port setting in the switch apparatuses. Because the position information distribution apparatuses, the IP address distribution apparatuses, and the terminals perform the same operations as those in the first embodiment, explanations of the operations will be omitted.

An operation (physical port setting) of the switch apparatuses 20 to 22 is explained. The physical port 23 of the switch apparatus 20 and the physical port 24 of the switch apparatus 21 allow a multicast address for position information distribution to pass. On the other hand, the physical port 25 of the switch apparatus 21 and the physical port 26 of the switch apparatus 22 block the multicast address for position information distribution.

Accordingly, the terminals 7 and 8 receive only the position information packet transmitted from the position information distribution apparatus 1 and the terminal 9 receives only the position information packet transmitted from the position information distribution apparatus 2.

Under conditions mentioned above, also in the second embodiment, an IP address of each of the terminals can be determined in an identical IP address determination procedure to that in the first embodiment. That is, when an IP address distribution system is configured in such a manner that specific physical ports of the switch apparatuses block the position information packets according to the number of the position information distribution apparatuses and the installation positions thereof and that the position information packet only from one of the position information distribution apparatuses is delivered to each of the terminals that receive distribution of an IP address, an IP address distribution system that achieves the same effect as that in the first embodiment can be realized.

Third Embodiment

Figure 7:
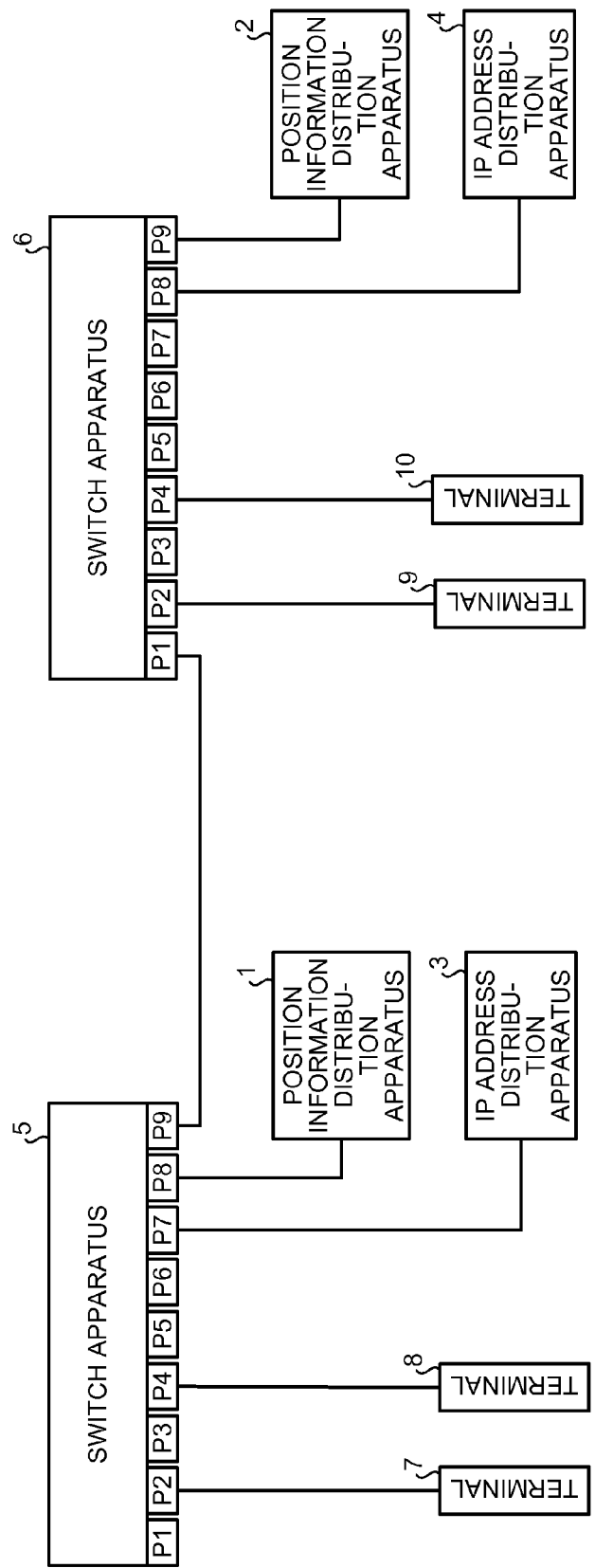
FIG. 7 is a configuration example of an IP address distribution system according to a third embodiment.

FIG. 7 is a configuration example of an IP address distribution system according to a third embodiment. Configurations of the IP address distribution system according to the present embodiment are identical to those of the IP address distribution system described in the first embodiment.

In the IP address distribution system according to the present embodiment, each of physical ports of the switch apparatuses 5 and 6 has an identification number (P1, P2, . . . ) and passage and blockage of the position information packet can be set with respect to each of the physical ports. Setting of passage and blockage of the position information packet in the switch apparatuses is performed by the involved position information distribution apparatuses. That is, the position information distribution apparatus 1 performs setting of delivery and blockage of the position information packet for each of physical ports of the switch apparatus 5 and the position information distribution apparatus 2 performs setting of delivery or blockage of the position information packet for each of physical ports of the switch apparatus 6. As in the first and second embodiments, specific physical ports of the switch apparatuses (physical ports to which the other switch apparatus is connected) block the position information packets to prevent the position information packets from two position information distribution apparatuses from being delivered to one terminal.

The position information distribution apparatuses 1 and 2 according to the present embodiment transmit the position information packet having a configuration shown in FIG. 8. FIG. 8 is a configuration example of the position information packet delivered by the position information distribution apparatuses in the third embodiment. That is, each of the position information distribution apparatuses 1 and 2 sets a position information value and a physical port number in the position information packet. Before transmission of the position information packet, each of the position information distribution apparatuses 1 and 2 controls the physical ports of the involved switch apparatus and performs setting to allow the position information packet to be transmitted only through a physical port corresponding to the physical port number set in the position information packet. While transmitting the position information packet periodically as in the first embodiment, each of the position information distribution apparatuses 1 and 2 transmits the position information packet with the physical port number in the position information packet changed with respect to each transmission. As a result, the physical port number in the position information packet cyclically changes. Each of the terminals can recognize the physical port number of the switch apparatus to which the terminal is connected.

FIG. 9 is a configuration example of an IP-address request signal transmitted by the terminals in the third embodiment. The IP-address request signal transmitted by the terminals according to the present embodiment has the same configuration as that of the IP-address request signal explained in the first embodiment. However, information set in the device-specific information is different. That is, each of the terminals according to the present embodiment sets the physical port number set in the position information packet received from the involved position information distribution apparatus as the device-specific information. The same information as that in the first embodiment is set as the transmission destination address, the transmission source address, and the position information value.

Each of the IP address distribution apparatuses 3 and 4 according to the present embodiment holds therein an IP-address distribution table corresponding to combinations of the position information value and the physical port number and, upon reception of an IP-address request signal from a terminal, determines an IP address using the position information and the physical port number set in the IP-address request signal and the IP-address distribution table held therein to distribute the determined IP address to the terminal.

As described above, according to the present embodiment, an IP address is distributed to correspond to the physical port of the switch apparatus to which a terminal is connected. Therefore, when a terminal is replaced with a new terminal due to a malfunction or the like, the same IP address as that of the old terminal can be assigned to the new terminal.

Fourth Embodiment

Figure 10:
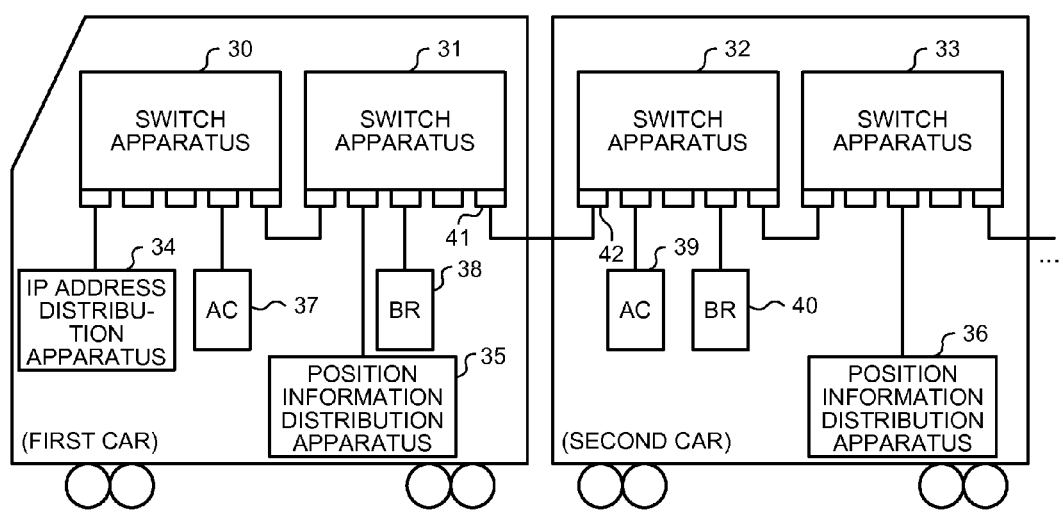
FIG. 10 is a configuration example of an IP address distribution system according to a fourth embodiment.

FIG. 10 is a configuration example of an IP address distribution system according to a fourth embodiment. In the present embodiment, an IP address distribution system established in a train is explained.

The IP address distribution system according to the present embodiment is configured to include switch apparatuses 30 to 33, an IP address distribution apparatus 34, and position information distribution apparatuses 35 and 36. These apparatuses are mounted on a train and the switch apparatuses 30 and 31, the IP address distribution apparatus 34, and the position information distribution apparatus 35 are mounted on a first car. The switch apparatuses 32 and 33 and the position information distribution apparatus 36 are mounted on a second car. The switch apparatus 31 and the IP address distribution apparatus 34 are connected to the switch apparatus 30. The position information distribution apparatus 35 is connected to the switch apparatus 31. A physical port 41 of the switch apparatus 31 and a physical port 42 of the switch apparatus 32 are connected to each other. The switch apparatus 33 is connected to the switch apparatus 32 and the position information distribution apparatus 36 is connected to the switch apparatus 33. An air conditioner (AC) 37 is connected as a terminal to the switch apparatus 30, a braking device (BR) 38 is connected as a terminal to the switch apparatus 31, and an air conditioner 39 and a braking device 40 are connected as terminals to the switch apparatus 32.

The apparatuses (the switch apparatuses, the IP address distribution apparatus, and the position information distribution apparatuses) constituting the IP address distribution system have the same functions as those of the apparatuses explained in the first embodiment.

In the IP address distribution system with the configuration mentioned above, the position information packets are blocked by physical ports that connect the switch apparatuses installed on different cars to each other. Specifically, the physical port 41 of the switch apparatus 31 blocks the position information packet transmitted from the position information distribution apparatus 35 and the physical port 42 of the switch apparatus 32 blocks the position information packet transmitted from the position information distribution apparatus 36.

This enables an IP address to be provided fixedly with respect to each car and with respect to each apparatus type. As a result, when the air conditioner or the braking device is replaced, the same IP address having been provided to the device before replacement can be assigned to a device after replacement.

The apparatuses explained in the third embodiment can be alternatively applied as the apparatuses that constitute the IP address distribution system shown in FIG. 10.

While an example where one position information distribution apparatus is installed in each of the cars and the position information packet from each of the position information distribution apparatuses is delivered into the same car has been described, configurations other than that shown in FIG. 10, such as a configuration including one position information distribution apparatus with respect to a plurality of cars to deliver the same position information packet to plural cars and a configuration including a plurality of position information distribution apparatuses in the same car to deliver plural kinds of position information packets to the same car can be used.

As explained in the respective embodiments, the IP address distribution system according to the present invention can provide an IP address fixedly to each terminal. Therefore, manual and individual setting of an IP address at the time of terminal replacement is not required.

INDUSTRIAL APPLICABILITY

As described above, the IP address distribution system according to the present invention is useful when it is necessary to manage and assign IP addresses while considering a physical configuration of a network.

REFERENCE SIGNS LIST 1, 2, 35, 36 Position information distribution apparatus
3, 4, 34 IP address distribution apparatus
5, 6, 20 to 22, 30 to 33 Switch apparatus
7 to 10 Terminal
37, 39 Air conditioner (AC)
38, 40 Braking device (BR)

The invention claimed is:

1. An IP address distribution system comprising:
a network including a plurality of switch apparatuses;
an IP address distribution apparatus that assigns an IP address according to a request from each of devices connected to the switch apparatuses; and
a plurality of position information distribution apparatuses that broadcast a position information packet including position information into the network,
wherein a specific physical port of at least one switch apparatus blocks the position information packet to cause only a single position information packet to be delivered to each of the devices,
wherein the devices transmit, when requesting assignment of an IP address, an IP-address request signal including the position information and device-specific information previously held, and
wherein the IP address distribution apparatus selects, when receiving the IP-address request signal, an IP address from a range corresponding to the position information and the device-specific information included in the IP-address request signal, and distributes the selected IP address to a request source device.

2. The IP address distribution system according to claim 1, wherein the devices cause information indicating a device type thereof to be included in the IP-address request signal, as the device-specific information.

3. The IP address distribution system according to claim 1, wherein the position information distribution apparatuses individually set whether a physical port that connects a device as a distribution target of a position information packet among physical ports of the switch apparatuses allows the position information packet to pass and then broadcast the position information packet including information of a physical port number, thereby notifying a device as a delivery destination of the position information packet of an identification number of a physical port to which the device is connected, and
wherein the devices cause an identification number of a physical port to which the devices are connected to be included in an IP-address request signal, as the device-specific information.

4. The IP address distribution system according to claim 1, wherein the network is a network established in a train.

5. The IP address distribution system according to claim 4, wherein the position information distribution apparatuses are installed in each car, and
wherein the switch apparatuses that are connected to switch apparatuses installed in other cars block the position information packet at physical ports to which the switch apparatuses installed in other cars are connected.

6. An IP address distribution method in a system that comprises a network including a plurality of switch apparatuses, an IP address distribution apparatus that assigns an IP address according to a request from each of devices connected to the switch apparatuses, and a plurality of position information distribution apparatuses that broadcast a position information packet including position information into the network, the IP address distribution method comprising:
- a position information delivery step of delivering only a single position information packet to each of the devices, by blocking the position information packet at a specific physical port of at least one switch apparatus;
- an IP address request step of transmitting, via the devices, an IP-address request signal including the position information and device-specific information previously held; and
- an IP address distribution step of selecting, when the IP-address distribution apparatus receives the IP-address request signal, an IP address from a range corresponding to the position information and the device-specific information included in the IP-address request signal, and distributing the selected IP address to a request source device.

7. The IP address distribution method according to claim 6, wherein the devices cause information indicating a device type thereof to be included in the IP-address request signal, as the device-specific information.

8. The IP address distribution method according to claim 6, further comprising:
- a physical-port-information notification step, via the position information distribution apparatuses, of individually setting whether a physical port that connects a device as a distribution target of a position information packet among physical ports of the switch apparatuses allows the position information packet to pass and then broadcasting the position information packet including information of a physical port number, thereby notifying a device as a delivery destination of the position information packet of an identification number of a physical port to which the device is connected; and
- wherein the devices cause an identification number of a physical port to which the devices are connected to be included in an IP-address request signal, as the device-specific information.

* * * * *